(12) United States Patent
Buijs et al.

(10) Patent No.: US 8,530,610 B2
(45) Date of Patent: Sep. 10, 2013

(54) PROCESS FOR PREPARING A POLYMER POLYOL

(75) Inventors: Andre Buijs, Amsterdam (NL); Paulus Jacobus Fennis, Amsterdam (NL); Willem Karzijn, Amsterdam (NL); Nico Maria Venne, Rotterdam (NL)

(73) Assignee: Shell Oil Company, Houston, TX (US)

( * ) Notice: Subject to any disclaimer, the term of this patent is extended or adjusted under 35 U.S.C. 154(b) by 20 days.

(21) Appl. No.: 13/393,705

(22) PCT Filed: Sep. 1, 2010

(86) PCT No.: PCT/EP2010/062788
§ 371 (c)(1),
(2), (4) Date: Mar. 21, 2012

(87) PCT Pub. No.: WO2011/026856
PCT Pub. Date: Mar. 10, 2011

(65) Prior Publication Data
US 2012/0184707 A1    Jul. 19, 2012

(30) Foreign Application Priority Data

Sep. 3, 2009  (EP) .................................... 09169381

(51) Int. Cl.
*C08G 63/02* (2006.01)
*C08G 64/00* (2006.01)

(52) U.S. Cl.
USPC .......................................................... 528/288

(58) Field of Classification Search
USPC .......................................................... 528/288
See application file for complete search history.

(56) References Cited

FOREIGN PATENT DOCUMENTS

| WO | WO9940144 | 8/1999 |
|---|---|---|
| WO | WO03097712 | 11/2003 |
| WO | WO2008122581 | 10/2008 |

*Primary Examiner* — Terressa Boykin

(57) ABSTRACT

The invention relates to a process for preparing a polymer polyol, comprising mixing in a reactor vessel, a base polyol, one or more ethylenically unsaturated monomers, a polymerization initiator, optionally a macromer, and optionally a chain transfer agent, and polymerizing the mixture thus obtained at a temperature of 50 to 200° C., wherein after discharging the reactor vessel content, the interior surface of the reactor vessel walls and/or any internals present in the reactor vessel are blasted with round media.

8 Claims, No Drawings

PROCESS FOR PREPARING A POLYMER POLYOL

PRIORITY CLAIM

The present application claims priority from PCT/EP2010/062788, filed 1 Sep. 2010, which claims priority from 09169381.2, filed 3 Sep. 2009.

The present invention relates to a process for preparing a polymer polyol.

In chemical processes where solid material is produced or used, solids may adhere to the interior walls of and any internals in the vessels wherein the chemical processes take place. Such adhesion can be so strong that after emptying the vessel, the solid material remains adhered to the interior walls as so-called fouling. In general, fouling comprises solid material adhered to a surface. Especially in batch or semi-batch processes, it is desired that before the next batch is performed or after a certain number of batches, the fouling is removed as much as possible. In general, it is thought that fouling reduces heat transfer.

A typical process for preparing a polymer polyol comprises mixing in a reactor vessel, a base polyol, one or more ethylenically unsaturated monomers, a polymerization initiator, optionally a macromer, and optionally a chain transfer agent, and polymerizing the mixture thus obtained at a temperature of 50 to 200° C. In such process, fouling is formed on the interior surface of the reactor vessel walls and/or any internals present in the reactor vessel. It is thought that such fouling reduces heat transfer. Heat transfer is needed to heat the reactant mixture before initiation of polymerisation and to remove the heat of the polymerisation reaction. A reduced heat transfer results in a longer batch time in case the polymer polyol preparation process is a batch process. For example, by a time increase for heating prior to the reaction less batches can be performed within the same time period.

It is known to remove fouling formed in polymer polyol preparation by using cleaning agents, such as acetone. However, it has been found that such acetone washings still result in a relatively long batch time, as is evident from a relatively high batch time increase from batch to batch.

The object of the present invention is to find a method by which the batch time increase from batch to batch in the above-mentioned polymer preparation process can be reduced to a considerably low level and for a relatively long period of time. Such reduced batch time increase would result in a capacity increase for the reactor vessel.

Surprisingly, it was found that said object is achieved by blasting the interior surface of the reactor vessel walls and/or any internals present in the reactor vessel with round media.

Accordingly, the present invention relates to a process for preparing a polymer polyol, comprising mixing in a reactor vessel, a base polyol, one or more ethylenically unsaturated monomers, a polymerization initiator, optionally a macromer, and optionally a chain transfer agent, and polymerizing the mixture thus obtained at a temperature of 50 to 200° C., wherein after discharging the reactor vessel content, the interior surface of the reactor vessel walls and/or any internals present in the reactor vessel are blasted with round media.

The present process may be a continuous, batch or semi-batch process. Preferably, the present process is a batch or semi-batch process. In a case where the present process is a batch process, the blasting treatment need not be carried out at the end of each batch procedure. The blasting treatment may be carried out after a certain number of batch procedures.

Preferably, directly before the blasting treatment is carried out, the interior surface of the reactor vessel walls and/or any internals present in the reactor vessel are washed with a cleaning agent, such as for instance acetone, methyl ethyl ketone, tetrahydrofuran or N-methyl pyrrolidone, after which the reactor content resulting from said washing is discharged before the blasting treatment is carried out.

In the present invention, the interior surface of the reactor vessel walls and/or any internals present in the reactor vessel are blasted with round media. Preferably, said round media are glass beads. Further, preferably, said round media have a size varying of from 50 to 300 micron.

In the present process, a polymer polyol is prepared by mixing a base polyol, one or more ethylenically unsaturated monomers, a polymerization initiator, optionally a macromer, and optionally a chain transfer agent, and polymerizing the mixture thus obtained at a temperature of 50 to 200° C. Processes for preparing polymer polyols are for example disclosed in WO1999040144, WO2003097712 and WO2008122581.

Such polymer polyol preparation is preferably carried out in a stainless steel reactor vessel. Further, preferably, the reactor vessel is continuously stirred tank reactor, more preferably a stainless steel, continuously stirred tank reactor.

The pressure at which polymerization when preparing a polymer polyol, may be carried out, is suitably comprised in the range of from 0.01 to 5 bar absolute, more suitably 0.05 to 4 bar absolute.

The base polyol used preferably is a polyether polyol, also frequently referred to as polyoxyalkylene polyols. Such polyether polyols are typically obtained by reacting a starting compound having a plurality of active hydrogen atoms with one or more alkylene oxides, such as ethylene oxide, propylene oxide, butylene oxide or mixtures of two or more of these. Suitable polyether polyols are those having a nominal molecular weight in the range of from 350 to 15,000 and an average nominal functionality (Fn) of at least 2.0. It has been found particularly advantageous to use polyols having a molecular weight in the range of from 2000 to 14,000. Such polyols preferably further have a Fn in the range of from 2.5 to 6.0. The hydroxyl value of the polyol suitably has a value of from 10 to 150 mg KOH/g, more suitably of from 20 to 75 mg KOH/g. Examples of suitable polyols include CARADOL SC46-02, CARADOL SC36-13, CARADOL MC36-03, CARADOL SC56-02, CARADOL SC36-11, CARADOL SC48-03 and CARADOL MH56-03 (CARADOL is a trademark). Most preferably, CARADOL SC56-02 polyol and CARADOL SC48-03 polyol are used.

Suitable ethylenically unsaturated monomers for preparing the dispersed polymer include vinyl aromatic hydrocarbons, like styrene, alpha-methyl styrene, beta-methyl styrene and various other alkyl-substituted styrenes. Of these, the use of styrene is preferred. The vinyl aromatic monomer may be used alone or in combination with other ethylenically unsaturated monomers, such as acrylonitrile, methacrylonitrile, vinylidene chloride, various acrylates and conjugated dienes like 1,3-butadiene and isoprene. Preferred ethylenically unsaturated monomers to be used for the purpose of the present invention are styrene and acrylonitrile in a weight ratio of from 30:70 to 100:0. It is, however, particularly preferred to use styrene alone or a combination of styrene and acrylonitrile in a weight ratio styrene:acrylonitrile of from 50:50 to 75:25, resulting in the dispersed polymers polystyrene and styrene-acrylonitrile (SAN) copolymers, respectively.

Preferably, a macromer is fed when preparing the polymer polyol. Within the present specification, a macromer is considered to be a polyol which may contain one or more unsaturations and which purpose is to effect a stable dispersion of the polymer particles in the base polyol, said polymer particles obtained from polymerizing one or more ethylenically unsaturated monomers. Macromers which can be used include, but are not limited to the reaction product of a polyol with a reactive unsaturated compound such as maleic anhydride, phthalic anhydride, fumaric acid, 1,1-dimethyl-m-isopropenyl-benzyl-isocyanate, isocyanatoethylmethacrylate, 2-butene-1,4-diol, 1-butene-3,4-diol, hydroxyethylmethacrylate, hydroxypropyl acrylate, methyl methacrylate, acrylic and methacrylic acid, methacryloyl chloride, glycidyl methacrylate and allyl glycidyl ether. If a polycarboxylic acid or anhydride is employed, it is preferred to react the unsaturated polyol with an alkylene oxide. The polyol for preparing the macromer preferably has a hydroxyl functionality of at least 2.

A preferred macromer has been described in WO1999040144. Such macromer is suitable as a stabiliser precursor in a polymer polyol, and has been prepared by a process which comprises reacting a polyol with a cyclic dicarboxylic acid anhydride not containing any polymerizable double bond, and subsequently reacting the adduct thus obtained with an epoxide compound containing a polymerizable double bond. The polyol preferably is sorbitol or a mixture of sorbitol with one or more diols (including water), said sorbitol or said mixture having reacted with a mixture of propylene oxide and ethylene oxide. The cyclic dicarboxylic acid anhydride preferably is phthalic anhydride. The epoxide compound preferably is glycidyl methacrylate or glycidyl acrylate. The adduct can first partly be reacted with a di- or higher functional epoxide compound before being reacted with the epoxide compound containing a polymerizable double bond. Further, the polyol can be reacted with a di- or higher functional isocyanate compound preceding the reaction between the polyol and the cyclic dicarboxylic acid anhydride. A method for preparing the macromer comprises reacting the adduct first partly with the epoxide compound containing a polymerizable double bond and subsequently reacting the reaction product thus obtained with a di- or higher functional epoxide compound or a di- or higher functional isocyanate compound.

The macromer preferably has a nominal molecular weight of at least 4000, preferably in the range of from 5000 to 50,000.

The amount of ethylenically unsaturated monomers present when preparing the polymer polyol can vary widely. At any time when preparing the polymer polyol, the amount of ethylenically unsaturated monomer will generally differ between of from 0 to 60% by weight based on total weight of base polyol, polymer, monomer(s) and optionally macromer. It is possible to have all base polyol fed initially, while it is also possible to add the majority of the base polyol after initiation of polymerization.

The additional base polyol optionally added after initiation of polymerization can be the same or can be different from the base polyol as initially fed. Preferably, the base polyol remains the same.

The polymerization initiator is usually applied in an amount of from 0.01 to 5% by weight based on total weight of monomers. Suitable polymerization initiators are known in the art and include both peroxide compounds and azo compounds. Suitable polymerization initiators that can be used in the present invention are the free-radical polymerization initiators described in EP1624005A1, which is herein incorporated by reference. Examples of peroxides are dibenzoyl peroxide, lauroyl peroxide, t-butyl hydroperoxide, benzoyl peroxide and di-t-butyl peroxide. Examples of suitable azo compounds are azobis(isobutyronitrile) (AIBN) and azobis(2-methylbutyronitrile) (AMEN).

Chain transfer agents may also be added to or be present in the polymerization reaction medium. Preferably, they are fed to the reactor in the initial phase of the present process. The use of chain transfer agents and their nature is known in the art. Chain transfer agents enable a control of the molecular weight and/or the cross-linking occurring between the various polymer molecules and hence may affect stability of the polymer polyol. If used at all, a chain transfer agent is suitably used in an amount of from 0.1 to 20% by weight, more suitably 0.2 to 10% by weight, and most suitably 0.3 to 5% by weight, based on total weight of end product. Examples of suitable chain transfer agents are 1-butanol, 2-butanol, isopropanol, ethanol, methanol, cyclohexane and mercaptans, such as dodecanethiol, ethanethiol, 1-heptanethiol, 2-octanethiol and toluenethiol. Preferably, isopropanol is used as a chain transfer agent.

Other compounds, such as compounds facilitating mixing of the various components, compounds which have a viscosity-lowering effect and/or compounds which enable one or more of the components used to better dissolve in the reaction medium may also be applied. An example of a compound having a viscosity-lowering effect, thus enabling a better mixing of the components, is toluene. Auxiliaries like toluene can be present in the feed and/or in the reactor.

The invention is further illustrated by the following Examples.

EXAMPLES

A polymer polyol is prepared by applying the following batch procedure, wherein the following compounds are used:

Base polyol=a polyether polyol containing randomly distributed ethyleneoxy and propyleneoxy monomers in the weight ratio of about 11/89. It is produced by using glycerol as the initiator and potassium hydroxide (KOH) as the catalyst. The base polyol has a weight average molecular weight of about 3,000 and has a OH value of about 54 mg KOH/g.

Styrene and acrylonitrile=ethylenically unsaturated monomers.

AMBN=azobis(2-methylbutyronitrile) (polymerization initiator).

Macromer=a polyol (in accordance with WO1999040144) having the following structure:

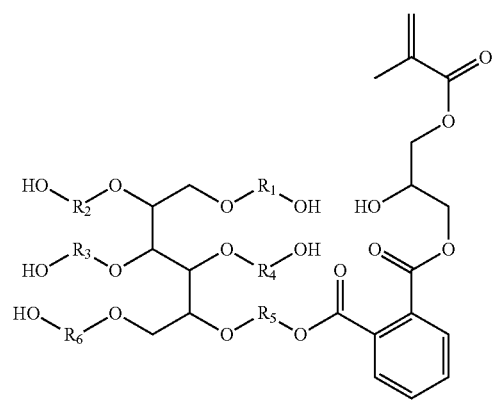

wherein $R_1$ to $R_6$ represent chains comprising randomly distributed propylene oxide (PO) and ethylene oxide (EO) monomers. The weight ratio of PO to EO in these chains is about 82/18. The weight average molecular weight per chain, averaged over all six chains, amounts to about 2,000.

IPA=isopropanol (chain transfer agent).

In the start-up phase of the batch, 182.5 g base polyol, 40.4 g macromer, 45.5 g IPA, 7.8 g styrene and 2.8 g acrylonitrile are fed to a reactor. The reactor is a stainless steel, continuously stirred tank reactor. Further, heating of the contents of the reactor to 100° C. is performed. This heating is attained by external heating, with steam, of the reactor wall.

Once the contents of the reactor has a temperature of about 100° C., the polymerisation is started by feeding 52.3 g of an 8 wt. % solution of AMBIT in the base polyol, 296.3 g base polyol, 295.7 g styrene and 140.1 g acrylonitrile to the reactor. The polymerization temperature within the reactor is maintained at 100° C.

A batch procedure similar to the one as described above was performed on a large scale. After discharging the reactor content, either a new batch procedure was started directly or, before starting the new batch procedure, the reactor was filled with acetone and the inside of the reactor was washed by stirring. Said washing with acetone was performed after a certain number of batches. After an acetone washing, the reactor content was discharged before the new batch procedure was started.

For each batch procedure that was not directly preceded by an acetone washing, the batch time increased as compared to the batch time of the preceding batch procedure. For the batch procedure that was directly preceded by an acetone washing, the batch time decreased as compared to the batch time of the preceding batch procedure.

Several campaigns comprising a certain number of batch procedures were performed. For each of these campaigns, only the last batch procedure in the campaign was followed by an acetone washing. It appeared that before applying the blasting treatment from the presently claimed process, the long term average for batch time increase was 1 minute. After an acetone washing, the batch time was decreased to a certain level, after which the batch time started increasing again from batch to batch till the next acetone washing. This long term campaign, which comprised a certain number of campaigns and accordingly the same number of acetone washings, is indicated in the table below as campaign X.

At the end of the last batch procedure of campaign X, the acetone washing was performed. Further, after discharging the reactor content resulting from said acetone washing, the blasting treatment from the presently claimed process was performed. This was done by blasting the reactor walls and internals present in the reactor with glass beads having a size varying of from 50 to 300 micron.

After said glass bead blasting, new campaigns, indicated in the table below as campaigns X+1, X+2, X+3 and X+4, were performed. For each of these campaigns X+1, X+2, X+3 and X+4, only the last batch procedure in the campaign was followed by an acetone washing. No glass bead blasting was performed. The number of batch procedures in each of said 4 campaigns is indicated in the table below.

Further indicated in said table, is the average batch time increase within a campaign. An average batch time increase of x minutes means that for a batch procedure that was not directly preceded by an acetone washing, the batch time increased by x minutes on average as compared to the batch time of the preceding batch procedure. The average value for said average batch time increase within a campaign was obtained by dividing the sum of the batch time increases for all batch procedures, except the first batch procedure that was (directly) preceded by an acetone washing, by the number of batch procedures minus 1 (i.e. said first batch procedure). Batch times do not include the time for acetone washing and glass bead treatment.

| Campaign | Number of batch procedures | Average batch time increase (min) |
| --- | --- | --- |
| X | long term | 1 |
| X + 1 | 299 | 0.26 |
| X + 2 | 116 | 0.62 |
| X + 3 | 112 | 0.70 |
| X + 4 | 122 | 0.88 |

From the above table it appears that by only applying acetone washings in campaign X, the batch time increase was about 1 minute. However, surprisingly, by the glass bead blasting at the end of campaign X, the batch time increase dropped significantly, namely to 0.26 minute for the next campaign X+1. This advantageously results in a significant production capacity increase.

For the next campaigns X+2, X+3 and X+4, the batch time increase increases again as compared to that of campaign X+1. However, even though said drop in the batch time increase as occasioned by the glass bead blasting is not permanent, said increase has been reduced for a considerably great number of batch procedures (at least 649) to a level below the previous level of about 1 minute. This has already resulted in a significant production capacity increase.

Such reduction in the batch time increase as caused by the glass bead blasting is surprising as it was expected that just like when washing with acetone, only the fouling would be removed and heat transfer consequentially improved, resulting in a shorter batch time. However, in addition to a shorter batch time, the glass bead blasting thus also resulted in a significant, relatively long lasting reduction in batch time increase as defined above. Without wishing to be bound by theory, it is believed that such reduction is the result of an unexpected change of fouling formation, as induced by the glass bead blasting, leading to reduction of fouling rate whereas by acetone washings alone the fouling formation mechanism and fouling rate remain unaffected.

What is claimed is:

1. A process for preparing a polymer polyol, comprising mixing in a reactor vessel, a base polyol, one or more ethylenically unsaturated monomers, and a polymerization initiator, and polymerizing the mixture thus obtained at a temperature of 50 to 200° C., wherein after discharging the reactor vessel content, the interior surface of the reactor vessel walls and any internals present in the reactor vessel are blasted with round media, the round media being glass beads having a size varying of from 50 to 300 microns.

2. A process according to claim 1, wherein directly before the blasting treatment is carried out, the interior surface of the reactor vessel walls and/or any internals present in the reactor vessel are washed with a cleaning agent after which the reactor content resulting from said washing is discharged before the blasting treatment is carried out.

3. A process according to claim 1, wherein the base polyol has a nominal molecular weight in the range of from 350 to 15,000 and an average nominal functionality (Fn) of at least 2.0.

4. A process according to claim 1, wherein the ethylenically unsaturated monomers are styrene and acrylonitrile in a weight ratio of from 30:70 to 100:0.

5. A process according to claim 1 comprising mixing a macromer with the base polyol, the one or more ethylenically unsaturated monomers, and the polymerization initiator in the reactor vessel.

6. A process according to claim 1 comprising mixing a chain transfer agent with the base polyol, the one or more ethylenically unsaturated monomers, and the polymerization initiator in the reactor vessel.

7. A process according to claim 5, wherein the macromer is obtained by reacting a polyol with a cyclic dicarboxylic acid anhydride not containing any polymerizable double bond, and subsequently reacting the adduct thus obtained with an epoxide compound containing a polymerizable double bond.

8. A process according to claim 7, wherein the cyclic dicarboxylic acid anhydride is phthalic anhydride.

* * * * *